(12) United States Patent
Park et al.

(10) Patent No.: US 11,614,377 B2
(45) Date of Patent: Mar. 28, 2023

(54) TRANSPARENT AND HIGHLY SENSITIVE PRESSURE SENSOR WITH IMPROVED LINEARITY AND PRESSURE SENSITIVITY

(71) Applicant: KOREA ADVANCED INSTITUTE OF SCIENCE AND TECHNOLOGY, Daejeon (KR)

(72) Inventors: Steve Park, Daejeon (KR); Han Byul Choi, Daejeon (KR); Jin Won Oh, Daejoen (KR); Jun Chang Yang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 233 days.

(21) Appl. No.: 17/109,731

(22) Filed: Dec. 2, 2020

(65) Prior Publication Data
US 2021/0302254 A1   Sep. 30, 2021

(30) Foreign Application Priority Data

Mar. 24, 2020 (KR) .................. 10-2020-0035417
Aug. 11, 2020 (KR) .................. 10-2020-0100776

(51) Int. Cl.
*G01L 19/14* (2006.01)
*G01L 9/00* (2006.01)

(52) U.S. Cl.
CPC .......... *G01L 19/148* (2013.01); *G01L 9/0051* (2013.01); *G01L 9/0072* (2013.01)

(58) Field of Classification Search
None
See application file for complete search history.

(56) References Cited

U.S. PATENT DOCUMENTS

| 10,275,068 | B2* | 4/2019 | Hoen | G06F 3/0412 |
| 2013/0082970 | A1* | 4/2013 | Frey | H01H 65/00 |
| | | | | 345/173 |
| 2016/0380404 | A1* | 12/2016 | Bulovic | G01L 11/02 |
| | | | | 372/20 |

FOREIGN PATENT DOCUMENTS

| KR | 10-2012-0122269 | 11/2012 |
| KR | 10-1269395 | 5/2013 |
| KR | 10-2015-0114509 | 10/2015 |
| KR | 10-2016-0139661 | 12/2016 |
| KR | 10-2017-0027566 | 3/2017 |
| KR | 10-2017-0085865 | 7/2017 |
| KR | 10-1759861 | 7/2017 |

(Continued)

OTHER PUBLICATIONS

Office Action dated Nov. 29, 2021 corresponding to Korean Patent Application No. 10-2020-0035417, 5 pages.

(Continued)

*Primary Examiner* — Lisa M Caputo
*Assistant Examiner* — Nigel H Plumb

(57) ABSTRACT

The present disclosure provides a transparent and highly sensitive pressure sensor with improved linearity and pressure sensitivity including: a first substrate on which a micropattern having pyramidal structures is formed; a first electrode layer coated on the micropattern of the first substrate; a second substrate stacked on the first electrode layer; and a second electrode layer stacked on the second substrate, wherein the first substrate and the second substrate show a difference in light refractive index of 10% or less in the visible light region.

17 Claims, 18 Drawing Sheets

(56) References Cited

FOREIGN PATENT DOCUMENTS

| KR | 10-2017-0126302 | 11/2017 |
| KR | 10-1956998 | 6/2019 |
| KR | 10-1973290 | 8/2019 |
| KR | 10-2063258 | 1/2020 |
| KR | 10-2141666 | 8/2020 |

OTHER PUBLICATIONS

Office Action dated Nov. 29, 2021 corresponding to Korean Patent Application No. 10-2020-0100775, 5 pages.

* cited by examiner

Capacitive pressure sensor (a)

(b)

1

TRANSPARENT AND HIGHLY SENSITIVE PRESSURE SENSOR WITH IMPROVED LINEARITY AND PRESSURE SENSITIVITY

CROSS-REFERENCE TO RELATED APPLICATION

This application claims priority of Korean Patent Application No. 10-2020-0035417, filed on Mar. 24, 2020, and priority of Korean Patent Application No. 10-2020-0100776, filed on Aug. 11, 2020, in the KIPO (Korean Intellectual Property Office), the disclosure of which is incorporated herein entirely by reference.

BACKGROUND OF THE INVENTION

Field of the Invention

The present disclosure relates to a transparent or highly sensitive pressure sensor, a method for manufacturing the same and an electronic device including the same. More particularly, the present disclosure relates to a micropattern-based transparent pressure sensor having high transparency and excellent sensing property and a highly sensitive pressure sensor using a polymer structure having porous pyramidal structures, a method for manufacturing the same, and an electronic device including the same.

Description of the Related Art

In general, a pressure sensor is an energy conversion system which converts mechanical energy into electrical energy and is used to measure absolute pressure or gauge pressure. Particularly, with reference to technology used for transparent touch panels, or the like, Korean Laid-Open Patent No. 10-2016-013966 (hereinafter, Reference 1) discloses a pressure sensor including: a substrate; a nanostructure layer including a plurality of nanomicro structures formed on the substrate; a conductive layer formed on the nanostructure layer; and an electrode formed on the conductive layer.

In addition, Korean Patent Publication No. 10-1973290 (hereinafter, Reference 2) discloses a transparent flexible pressure sensor which can detect or sense pressure through a change in area of the sintered surface of a portion sintered by laser that is in contact with a nanowire layer, depending on pressure. Further, Korean Laid-Open Patent No. 10-2017-0027566 (hereinafter, Reference 3) discloses an electrostatic capacitive pressure sensor characterized in that it includes: a first electrode layer; a second electrode layer spaced apart from the first electrode layer; and a dielectric layer formed between the first electrode layer and the second electrode layer, wherein the dielectric layer includes a porous elastic polymer.

However, References 1-3 are problematic in that it is difficult to provide a pressure sensor which shows high transparency, a broad detection range of pressure and linearity of variations in electrostatic capacity as a function of pressure at the same time. In addition, elastic material-based pressure sensors developed to date have low sensitivity and show a limitation in detection. Therefore, there is a need for providing a transparent or highly sensitive pressure sensor having high transparency, high sensitivity and excellent sensing property.

SUMMARY OF THE INVENTION

A technical problem to be solved by the present disclosure is to provide a transparent or highly sensitive pressure sensor having high transparency, high sensitivity and excellent sensing property, a method for manufacturing the same, and an electronic device using the same.

In one general aspect, there is provided a transparent pressure sensor including: a first substrate on which a micropattern having pyramidal structures is formed; a first electrode layer coated on the micropattern of the first substrate; a second substrate stacked on the first electrode layer; and a second electrode layer stacked on the second substrate, wherein the first substrate and the second substrate show a difference in light refractive index 10% or less in the visible light region.

According to an embodiment of the present disclosure, the first substrate has lower ductility as compared to the second substrate.

According to another embodiment of the present disclosure, the first substrate undergoes a decrease in height and angle, while maintaining the pyramidal structures, as the second substrate is pressed.

According to still another embodiment of the present disclosure, the micropattern having pyramidal structures of the first substrate is filed with the second substrate.

According to still another embodiment of the present disclosure, the transparent pressure sensor measures pressure applied thereto through a change in effective area of the first electrode layer having the pyramidal structures deformed by the applied pressure.

According to still another embodiment of the present disclosure, the first substrate and the second substrate include polydimethyl siloxane.

According to still another embodiment of the present disclosure, the first electrode layer and the second electrode layer are transparent electrodes.

According to still another embodiment of the present disclosure, the ratio of the height of the pyramidal structure to the distance between the second substrate and the vertex of the pyramidal structure is equal to or more than 0.5 and less than 5.

In another aspect of the present disclosure, there is provided an electronic device including the transparent pressure sensor.

In still another aspect of the present disclosure, there is provided a method for manufacturing the transparent pressure sensor, including the steps of: coating the first electrode layer on the first substrate on which the micropattern having pyramidal structures is formed; and stacking the second substrate material on the first substrate after the coating step, wherein the first substrate and the second substrate show a difference in light refractive index 10% or less in the visible light region.

According to an embodiment of the present disclosure, the first substrate has lower ductility as compared to the second substrate.

According to another embodiment of the present disclosure, the micropattern having pyramidal structures of the first substrate may be filled with the second substrate.

According to still another embodiment of the present disclosure, the first substrate and the second substrate include polydimethyl siloxane, and the first electrode layer includes PEDOT:PSS (poly(3,4-ethylenedioxythiophene):polystyrene sulfonate) conductive polymer.

In still another aspect of the present disclosure, there is provided an electrostatic capacitive highly sensitive pressure sensor, including an upper electrode layer, a polymer layer including a polymer material having porous pyramidal structures, and a lower electrode layer.

According to an embodiment of the present disclosure, the polymer material is polydimethyl siloxane (PDMS), and the upper electrode layer and the lower electrode layer are indium tin oxide (ITO)/polyethylene terephthalate (PET) electrodes.

According to another embodiment of the present disclosure, the electrostatic capacitive pressure sensor measures pressure applied thereto through a change in thickness of the polymer layer caused by deformation of the porous pyramidal structures upon the pressure application.

In still another aspect of the present disclosure, there is provided a contact resistance-based highly sensitive pressure sensor, including a substrate, an electrode formed on the substrate, a polymer structure having porous pyramidal structures, and a conductive polymer coated on the polymer structure.

According to an embodiment of the present disclosure, the polymer structure includes polydimethyl siloxane (PDMS), and the conductive polymer is polypyrrole (PPy).

According to another embodiment of the present disclosure, the contact resistance-based pressure sensor measures pressure applied thereto through a change in contact area between the conductive polymer and the electrode caused by deformation of the porous pyramidal structures upon the pressure application.

In still another aspect of the present disclosure, there is provided a method for manufacturing a porous pyramidal polymer structure, including the steps of: depositing polymer beads on a mold provided with a micropattern having pyramidal structures; coating a polymer material on the mold on which the polymer beads are deposited; and removing the mold and the polymer beads.

According to an embodiment of the present disclosure, the polymer bead includes polystyrene (PS), and the polymer material is polydimethyl siloxane (PDMS).

In still another aspect of the present disclosure, there is provided a porous pyramidal polymer structure obtained by the method.

In yet another aspect of the present disclosure, there is provided an electronic device including the highly sensitive pressure sensor.

The transparent pressure sensor according to an embodiment of the present disclosure has excellent light transmittance by using the substrates having a similar refractive index with the pyramidal structures. In addition, the electrode is formed with a pattern capable of retaining the pyramidal structures even when pressure is applied thereto, and thus high linearity and sensitivity can be provided. Therefore, the transparent pressure sensor according to an embodiment of the present disclosure may be used effectively for any electronic devices, such as displays, requiring a pressure sensor.

The highly sensitive pressure sensor according to another embodiment of the present disclosure includes a polymer structure having porous pyramidal structures and provides maximized vertical deformation by the porous structure of the polymer structure, and thus has excellent sensitivity. In addition, both electrostatic capacitive and contact resistance-based highly sensitive pressure sensors can be operated, and the highly sensitive pressure sensor can detect minute pressure and can be applied to health-care wearable devices, robots, or the like.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

Figure 1:
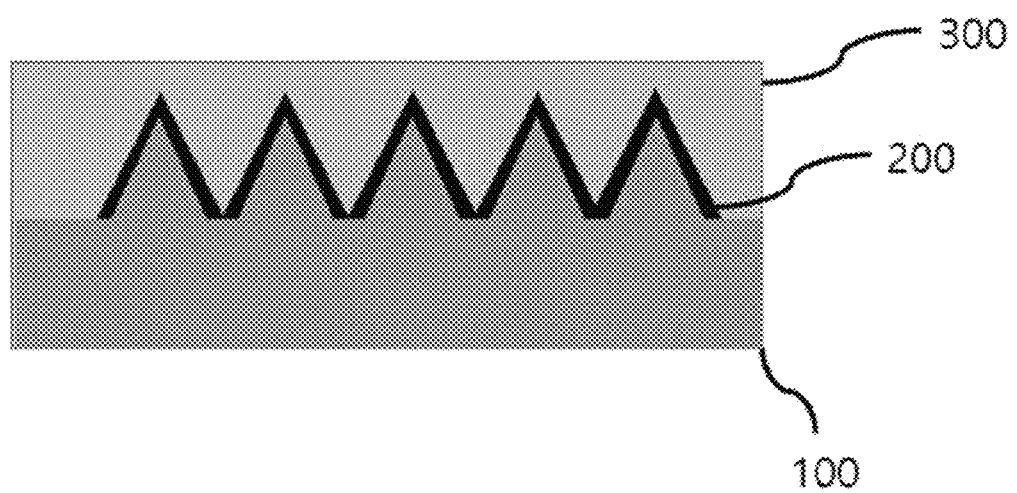
FIG. 1 is a sectional view illustrating the transparent pressure sensor according to an embodiment of the present disclosure.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Hereinafter, preferred embodiments of the transparent or highly sensitive pressure sensor according to the present disclosure, a method for manufacturing the same and an electronic device including the same will be explained in detail with reference to the accompanying drawings. For reference, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In order to solve the problems of the pressure sensor according to the relates art, i.e. the problems of low transparency and non-linear pressure sensing, materials having a similar light refractive index are used to maximize the transparency of a sensor.

In addition, since a pyramidal pattern deformable depending on pressure is used and an area between electrodes variable with pressure is used, it is possible to obtain linear electrical signals depending on pressure. Therefore, it is possible to carry out pressure sensing more accurately in response to an increase/decrease in pressure.

FIG. 1 is a sectional view illustrating the transparent pressure sensor according to an embodiment of the present disclosure.

Referring to FIG. 1, the transparent pressure sensor according to the present disclosure includes: a first substrate 100 on which a micropattern having pyramidal structures is formed; a first electrode layer 200 coated on the micropattern of the first substrate; and a second substrate 300 stacked on the electrode layer.

According to an embodiment of the present disclosure, both the first substrate 100 and the second substrate 300 include polydimethyl siloxane (PDMS), wherein the first substrate includes hard polydimethyl siloxane and the second substrate includes soft polydimethyl siloxane.

According to the present disclosure, the front surface of the sensor to which light is irradiated shows minimized scattering and refraction of the irradiated light by using the second substrate 300 and the first electrode 200 coated on the pyramidal pattern having a similar light refractive index. According to an embodiment of the present disclosure, a transparent PEDOT:PSS conductive polymer is used for the electrode layer. However, any material having at least a predetermined level of transparency may be used within the scope of the present disclosure.

According to the present disclosure, materials having a similar refractive index (showing a difference in refractive index of 10% or less in the visible light region) are used for a lower substrate having pyramidal structures and a substrate with which the lower pyramidal structures is filled. In other words, according to an embodiment of the present disclosure, polydimethyl siloxanes having different ductility but substantially the same refractive index are used to obtain such transparency. When the materials have a similar refractive index, i.e. when the difference in refractive index between the two substrates is 10% or less in the visible light region, it is possible to obtain a pressure sensor having at least a predetermined level of transparency within the scope of the present disclosure.

In another aspect, the transparent pressure sensor according to the present disclosure can sense a change in electrostatic capacity linearly with high sensitivity by using a change in area of the electrode layer having pyramidal structures deformable depending on application of pressure.

Figure 2:
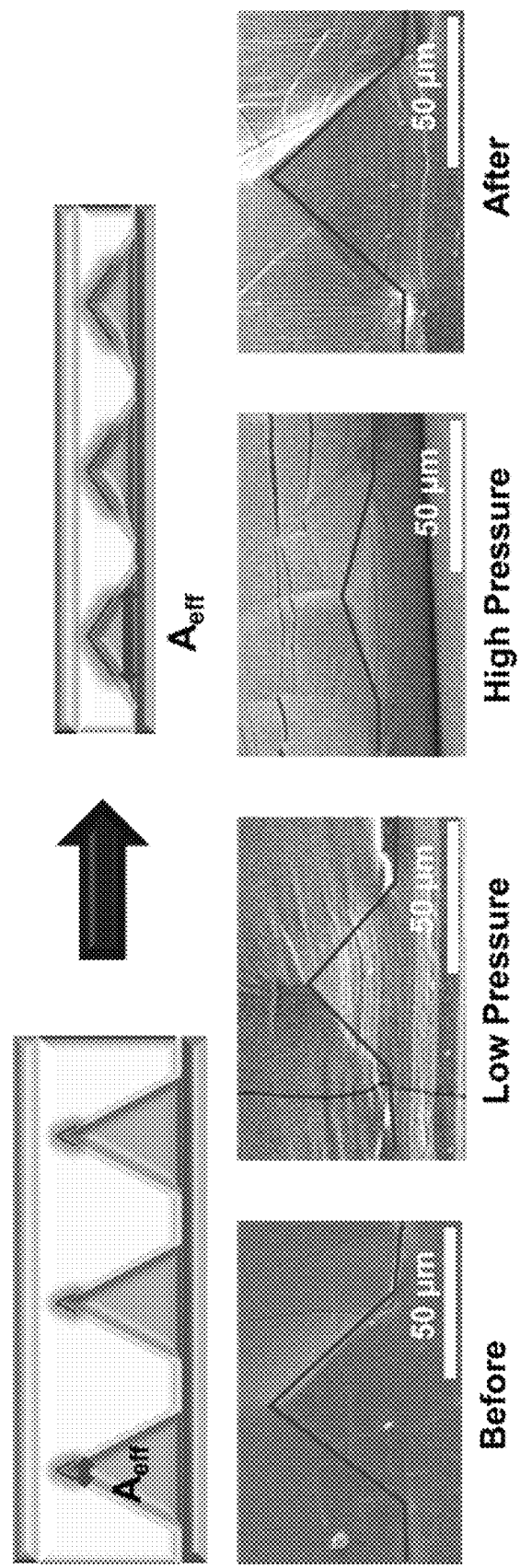
FIG. 2 illustrates the theory of sensing a change in electrostatic capacity of the pressure sensor according to an embodiment of the present disclosure.

FIG. 2 illustrates the theory of sensing a change in electrostatic capacity of the pressure sensor according to an embodiment of the present disclosure.

Referring to FIG. 2, the electrode pattern having pyramidal structures is pressed more severely as pressure is increased, which causes maximization of the effective area (Aeff) between two electrodes to induce a linear change in electrostatic capacity.

Figure 3:
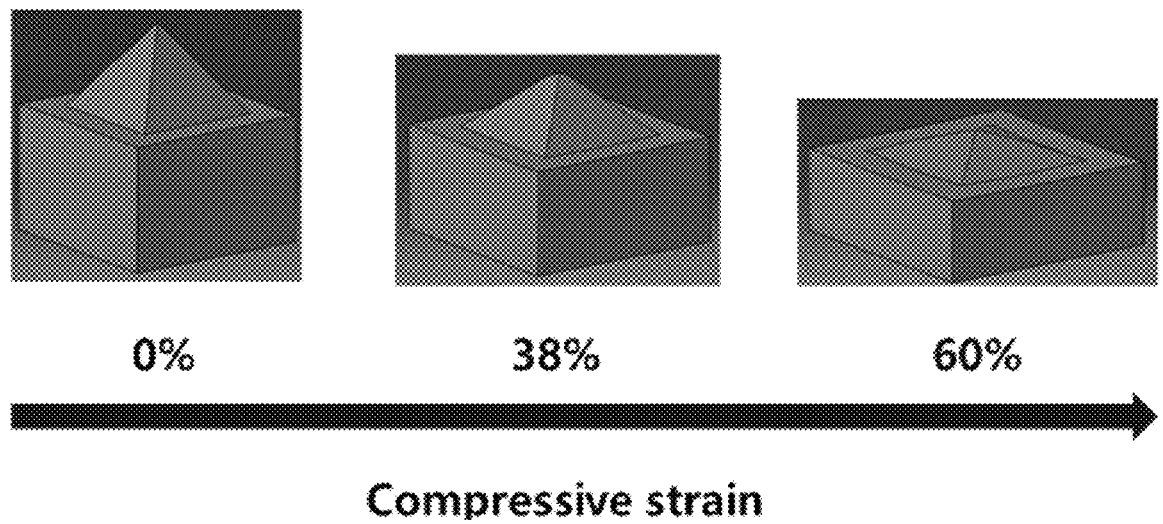
FIG. 3 illustrates the result of simulating the transparent pressure sensor according to an embodiment of the present disclosure, when pressure is applied thereto.
Figure 4:
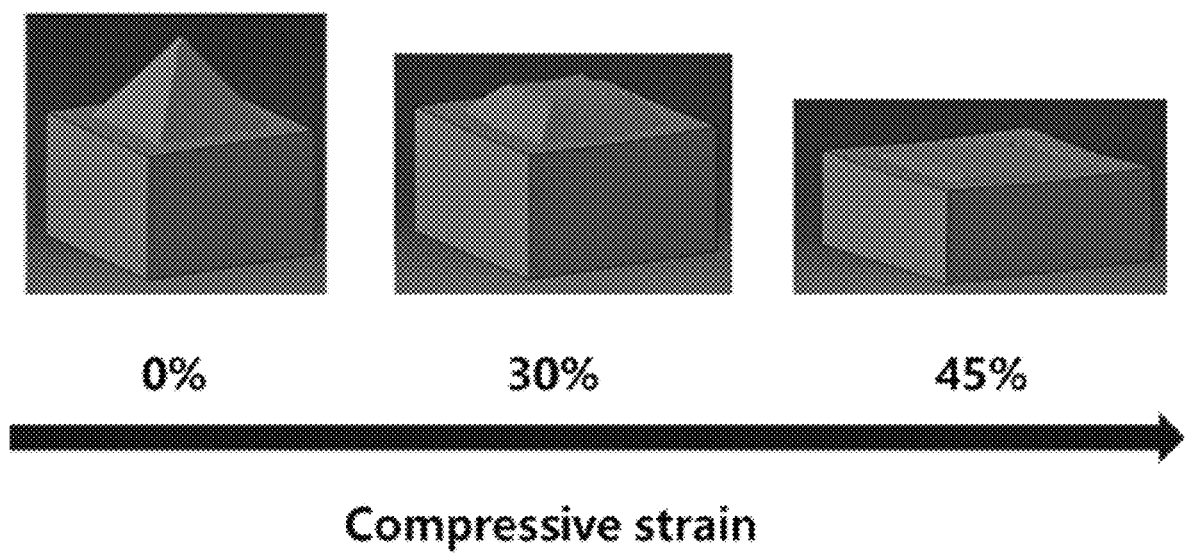
FIG. 4 illustrates the result of simulating an electrode layer pressed without the second substrate.

FIG. 3 illustrates the result of simulating the transparent pressure sensor according to an embodiment of the present disclosure, when pressure is applied thereto, and FIG. 4 illustrates the result of simulating an electrode layer pressed without the second substrate.

Referring to FIG. 3 and FIG. 4, it can be seen that as the second substrate (substrate having higher ductility) is pressed, the pyramidal PDMS of the first substrate (substrate having lower ductility) according to the present disclosure is spread broadly, while maintaining the pyramidal shape. In FIG. 3, PDMS of the first substrate having higher rigidity undergoes a decrease in height, while retaining the vertex, resulting in an increase in electrode area (effective area) of the transparent pressure sensor that gets close to the counter electrode, unlike FIG. 4.

In other words, before the initial pressure application, only the vertex portion close to the upper counter electrode is available and this portion determines the overall electrostatic capacity. However, after compression, the pyramids undergo a linear decrease in height and angle, resulting in a gradual increase in area that gets close to the upper electrode (effective area, i.e. electrode area in the region of the distance between electrodes that may affect electrostatic capacity characteristics).

As discussed above, according to the present disclosure, the pyramidal shape undergoes a decrease in height and angle, while retaining the vertex (horn), when pressure is applied thereto. Therefore, the effective area (electrode area having an effective distance from the counter electrode) is increased linearly as a whole, and thus linear pressure signals can be sensed.

According to another embodiment of the present disclosure, in order to overcome the above-mentioned problem of the pressure sensors according to the related art, i.e. limitation in pressure sensing caused by low sensitivity, a polymer structure having porous pyramidal structures is used to improve the sensitivity of a pressure sensor.

Figure 14:
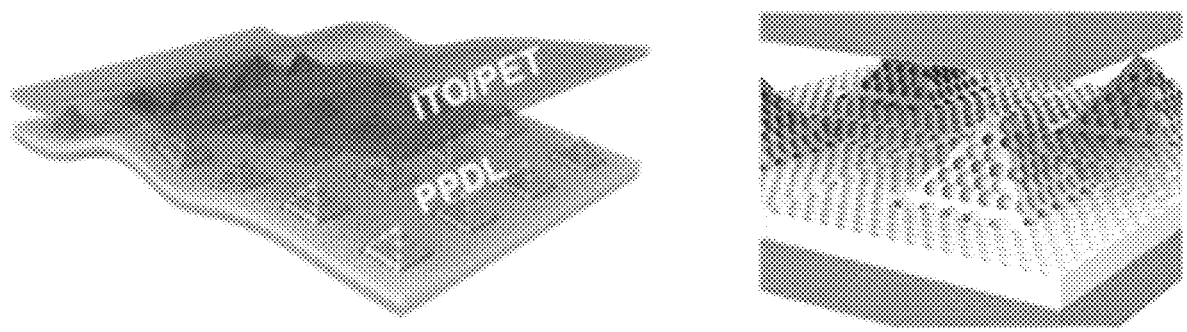
FIG. 14 illustrates the electrostatic capacitive highly sensitive pressure sensor according to another embodiment of the present disclosure.

FIG. 14 illustrates the electrostatic capacitive highly sensitive pressure sensor according to another embodiment of the present disclosure.

Referring to FIG. 14, the electrostatic capacitive highly sensitive pressure sensor according to another embodiment of the present disclosure includes an upper electrode layer, a polymer layer including a polymer structure having porous pyramidal structures, and a lower electrode layer.

According to another embodiment of the present disclosure, the polymer layer including a polymer structure having porous pyramidal structures is disposed between the upper electrode layer and the lower electrode layer and functions as a dielectric.

According to still another embodiment of the present disclosure, the polymer structure may include polydimethyl siloxane (PDMS), and the upper electrode layer and the lower electrode layer may be indium tin oxide/polyethylene terephthalate (ITO/PET) electrodes, but the scope of the present disclosure is not limited thereto.

Figure 15:
FIG. 15 illustrates the theory of the operation of the electrostatic capacitive highly sensitive pressure sensor according to another embodiment of the present disclosure.

FIG. 15 illustrates the theory of the operation of the electrostatic capacitive highly sensitive pressure sensor according to another embodiment of the present disclosure.

Referring to FIG. 15, the electrostatic capacitive highly sensitive pressure sensor according to another embodiment of the present disclosure measures pressure by inducing a change in electrostatic capacity through a change in thickness of the polymer layer caused by deformation of the polymer structure having porous pyramidal structures upon the pressure application.

More particularly, the polymer layer has a thickness of 'd0' before pressure application, but the thickness of the polymer layer is reduced to 'd' due to the deformation of the polymer structure having porous pyramidal structures, after pressure application. Therefore, the distance between the upper electrode layer and the lower electrode layer is reduced so that a change in electrostatic capacity may be sensed and pressure may be determined.

Herein, the polymer structure having porous pyramidal structures shows a significantly high degree of vertical deformation depending on pressure due to its low compressive elastic modulus, and thus has a broader range of pressure sensing and higher sensitivity, as compared to a polymer structure having basic pyramidal structures.

Figure 16:
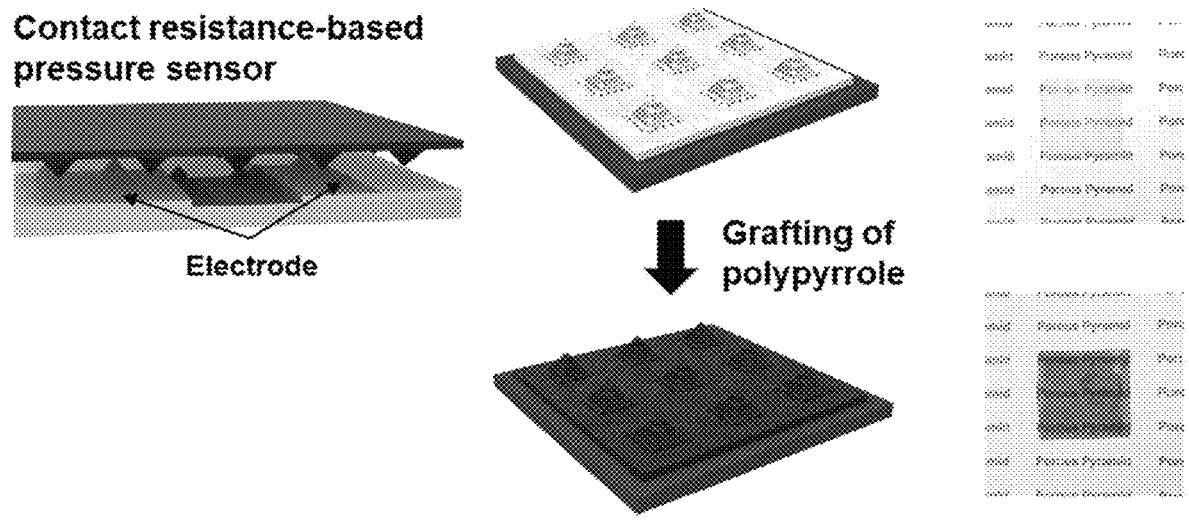
FIG. 16 illustrates the contact resistance-based highly sensitive pressure sensor according to still another embodiment of the present disclosure and a polymer structure having porous pyramidal structures coated with a conductive polymer.

FIG. 16 illustrates the contact resistance-based highly sensitive pressure sensor according to still another embodiment of the present disclosure and a polymer structure having porous pyramidal structures coated with a conductive polymer.

Referring to FIG. 16, the contact resistance-based highly sensitive pressure sensor according to still another embodiment of the present disclosure includes a substrate, an electrode formed on the substrate, a polymer structure including a polymer structure having pyramidal structures, and a conductive polymer coated on the polymer structure.

According to an embodiment of the present disclosure, the polymer structure may include polydimethyl siloxane (PDMS) and the conductive polymer may include polypyrrole (PPy), but the scope of the present disclosure is not limited thereto. When using PDMS as the polymer structure, PDMS is amenable to chemical coating as a conductive polymer, and thus PPy, which is a conductive polymer, may be coated on PDMS.

Figure 17:
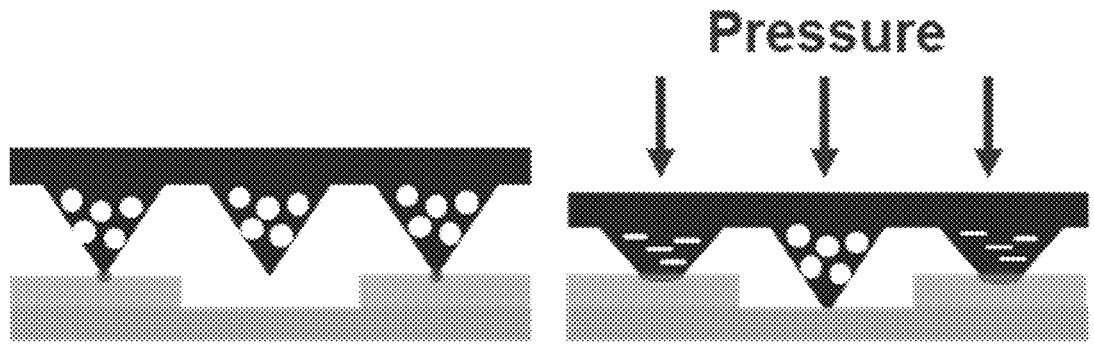
FIG. 17 illustrates the theory of the operation of the contact resistance-based highly sensitive pressure sensor according to still another embodiment of the present disclosure.

FIG. 17 illustrates the theory of the operation of the contact resistance-based highly sensitive pressure sensor according to still another embodiment of the present disclosure.

Referring to FIG. 17, the contact resistance-based highly sensitive pressure sensor according to still another embodiment of the present disclosure measures pressure through a change in contact area between the conductive polymer and the electrode caused by deformation of the polymer structure having porous pyramidal structures upon the pressure application.

More particularly, the contact area between the conductive polymer and the electrode is narrow before pressure application due to the polymer structure having porous pyramidal structures, but is increased after pressure application due to the deformation of the polymer structure having porous pyramidal structures. In other words, the contact resistance between the conductive polymer and the electrode caused by a change in contact area is sensed and a change in electric current caused thereby is derived to measure pressure.

Herein, the polymer structure having porous pyramidal structures shows a significantly high degree of vertical deformation depending on pressure due to its low compressive elastic modulus and has a larger range of change in contact area, as compared to a polymer structure having basic pyramidal structures, and thus provides a broader range of pressure sensing and higher sensitivity.

Figure 18:
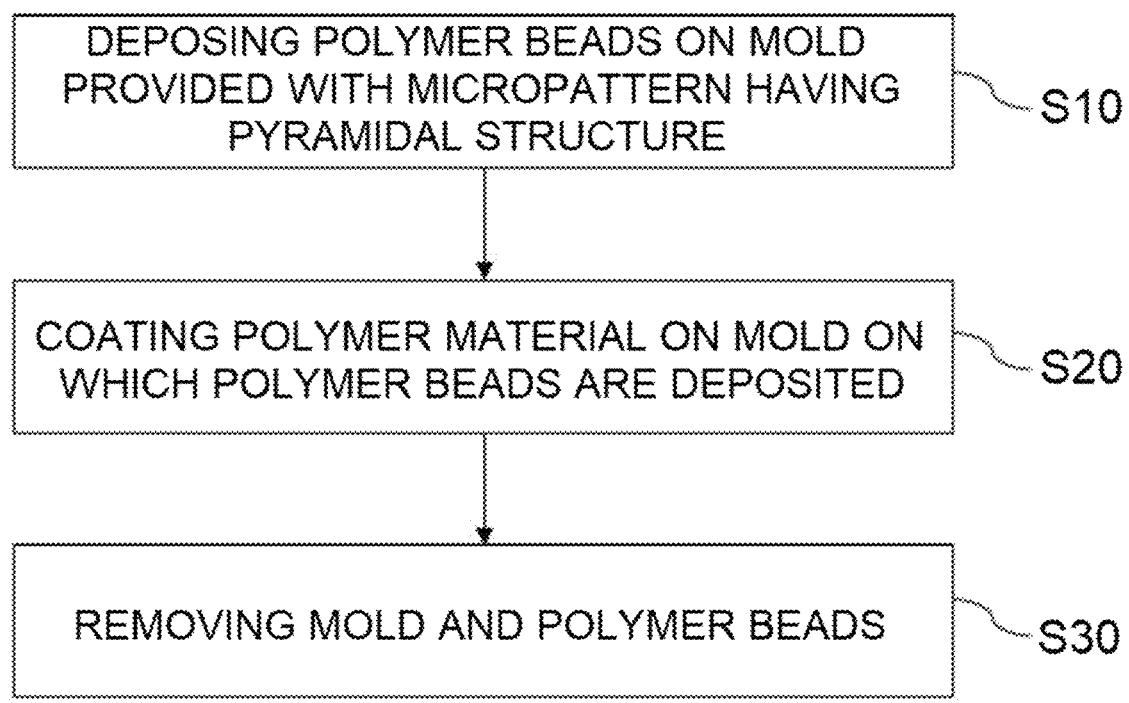
FIG. 18 is a flow chart illustrating the method for manufacturing a porous pyramidal polymer structure according to an embodiment of the present disclosure.

FIG. 18 is a flow chart illustrating the method for manufacturing a porous pyramidal polymer structure according to an embodiment of the present disclosure.

Referring to FIG. 18, the method for manufacturing a porous pyramidal polymer structure according to an embodiment of the present disclosure may include the steps of: depositing polymer beads on a mold provided with a micropattern having pyramidal structures (S10); coating a polymer material on the mold on which the polymer beads are deposited (S20); and removing the mold and the polymer beads (S30).

The polymer bead may include polystyrene (PS), and the polymer material may be polydimethyl siloxane (PDMS), but the scope of the present disclosure is not limited thereto.

According to an embodiment of the present disclosure, polystyrene (PS) beads may be used for a silicon mold provided with a micropattern having pyramidal structures to obtain a polydimethyl siloxane (PDMS)-based porous pyramidal structure, which may be applied to an electrostatic capacitive or contact resistance-based pressure sensor to obtain a highly sensitive pressure sensor.

As described above, it is possible to carry out detection of minute pressure in a broad range of pressure by increasing the sensitivity and stability of a pressure sensor through the use of a polymer structure having porous pyramidal structures according to another embodiment of the present disclosure. Therefore, it is possible to apply the pressure sensor to a smart glove capable of distinguishing various objects, health-care wearable devices, robots, or the like.

Hereinafter, the transparent or highly sensitive pressure sensor according to an embodiment of the present disclosure and a method for manufacturing the same will be explained in more detail with reference to Examples and Test Examples.

Examples

Figure 5:
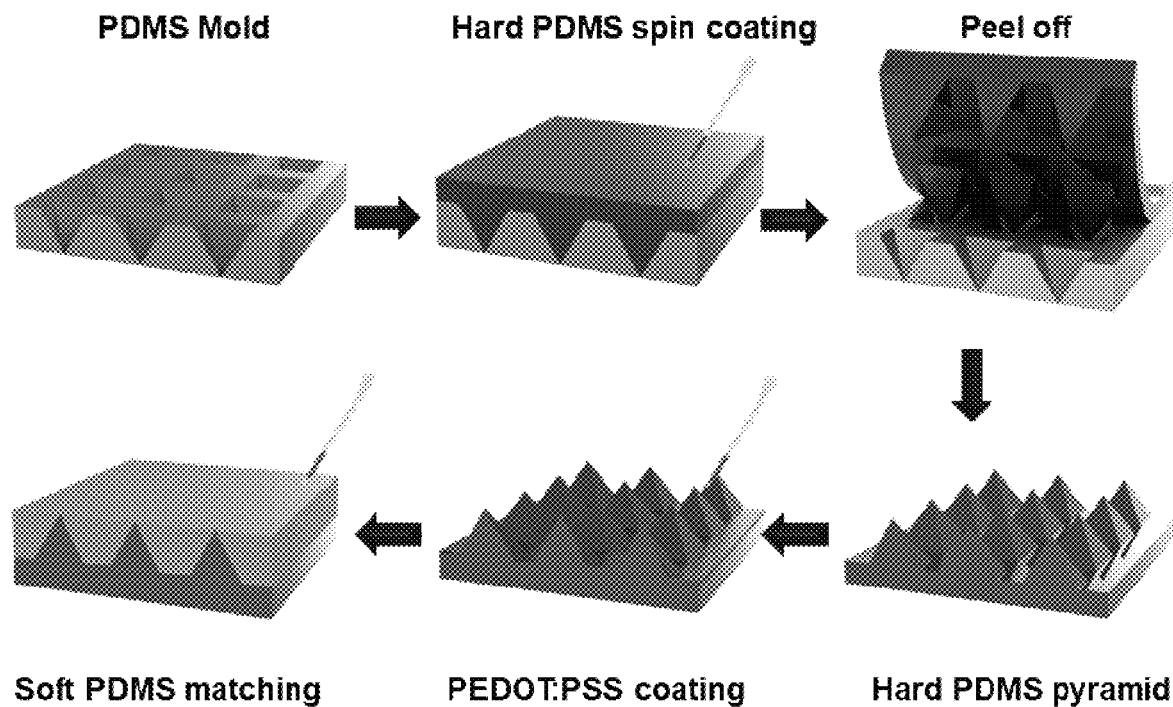
FIG. 5 illustrates the method for manufacturing a transparent sensor according to an embodiment of the present disclosure.

FIG. 5 illustrates the method for manufacturing a transparent sensor according to an embodiment of the present disclosure. Herein, FIG. 5 will be explained in more detail with reference to test examples.

Manufacture of Mycropyramidal Pattern Mold

First, an etched pyramidal silicon mold having a fluorinated surface was obtained by using photolithography, anisotropic etching and chemical vapor deposition of trichloro-(1H, 1H, 2H, 2H-perfluorooctyl)silane.

The pyramid had a basic width and height of 55 μm and 35 μm, respectively, and three types of silicon molds having a different interval between pyramids were used (20 μm, 50 μm and 90 μm). A polydimethyl siloxane (PDMS) base solution and a curing agent were mixed mechanically at a weight ratio of 10:1, deaeration was carried out to remove air bubbles, and the resultant solution was poured to the silicon mold to obtain a PDMS pyramid mold. Next, PDMS was cured at 80° C. for 3 hours and took up from the mold. Then, the above-mentioned steps were repeated by using the PDMS pyramid mold to obtain another PDMS pyramid mold having the same etched pyramidal pattern as the etched pyramidal pattern of the original silicon mold.

Manufacture of Transparent Linear Pressure Sensor

A PDMS base solution and a curing agent were mixed mechanically at a weight ratio of 2:1 in the case of hard polydimethyl siloxane (PDMS), or at a weight ratio of 30:1 in the case of soft polydimethyl siloxane (PDMS). Next, a hard polydimethyl siloxane (PDMS) solution was spin-coated on the pyramidal polydimethyl siloxane mold at 800 rpm for 30 seconds, and the resultant structure was introduced to an oven and heated at 80° C. for 3 hours. Then, the cured hard polydimethyl siloxane pyramids were removed from the mold. The hard polydimethyl siloxane as the first substrate was treated with $O_2$ plasma before depositing PEDOT:PSS (poly(3,4-ethylenedioxythiophene):polystyrene sulfonate) as the first electrode layer. Aqueous PEDOT:PSS solution (M122 PH1000 100 mL) was purchased from Ossila, and 1 mL of the solution was mixed with 50 μL of ethylene glycol, 1 μL of dodecylbenzene sulfonic acid and 10 μL of (3-glycidyloxypropyl)trimethoxysilane to improve the conductivity of the PEDOT:PSS solution. After that, the resultant PEDOT:PSS solution was spin-coated on the hard PDMS pyramids at 2000 rpm for 30 seconds. The spin-coated sample was disposed on a hot plate and heated at 100° C. for 10 minutes. Then, copper wires were attached to the coating layer of PEDOT:PSS as the first electrode layer. After that, a soft polydimethyl siloxane solution was spin-coated on the sample at 1000 rpm for 30 seconds. The coated sample was introduced to an oven and heated at 80° C. for 12 hours. Then, an indium tin oxide/polyethylene terephthalate (ITO/PET) film as the second electrode layer was disposed on the sensor with the soft PDMS surface side up.

Manufacture of PDMS Structure Having Porous Pyramidal Structures

Figure 19:
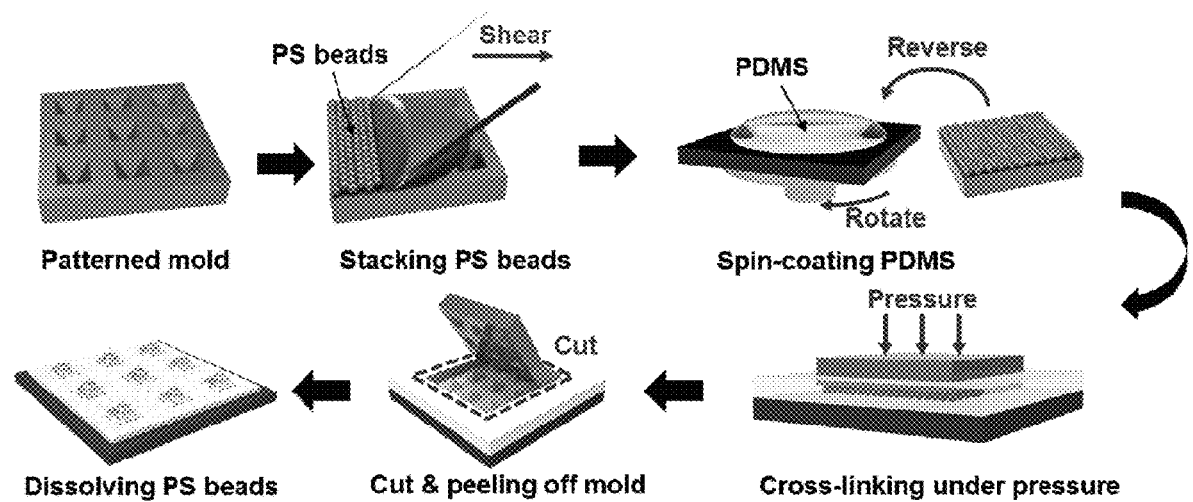
FIG. 19 is a schematic view illustrating a process of manufacturing a PDMS structure having a porous pyramidal structure.
Figure 20:
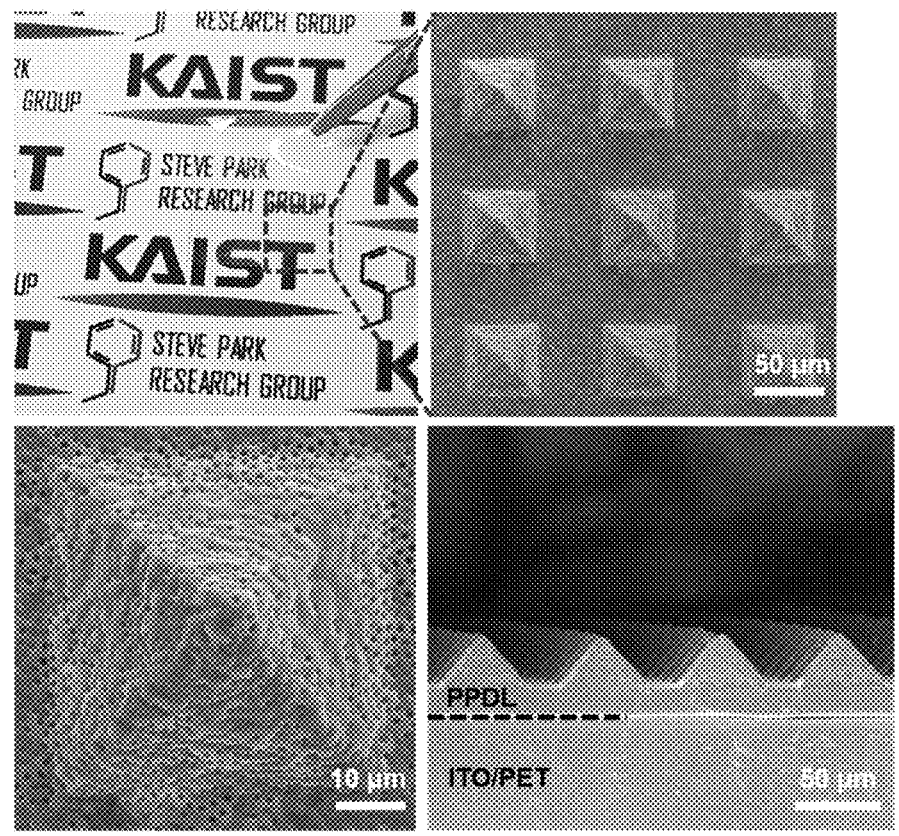
FIG. 20 illustrates a scanning electron microscopic (SEM) image of the PDMS structure having a pyramidal structure.

FIG. 19 is a schematic view illustrating a process of manufacturing a PDMS structure having a porous pyramidal structure, and FIG. 20 illustrates a scanning electron microscopic (SEM) image of the PDMS structure having pyramidal structures.

Referring to FIG. 19 and FIG. 20, a solution containing polystyrene (PS) beads was poured to a silicon mold provided with a micropattern having pyramidal structures, and shear stress was applied thereto, while carrying out heat treatment, so that the PS beads might be concentrated in a vacant space. Then, a silicon mold containing PS beads in non-crosslinked PDMS was subjected to soft lithography to obtain PDMS having pyramidal structures in which PS beads were embedded. Then, the PS beads were removed by dipping them in an organic solvent to obtain polydimethyl siloxane (PDMS) having porous pyramidal structures.

Manufacture of Electrostatic Capacitive Pressure Sensor

When manufacturing porous pyramidal structures, non-crosslinked PDMS was coated on an ITO/PET electrode to a smaller thickness and soft lithography was carried out to obtain PDMS having pyramidal structures attached to ITO/PET. Additionally, ITO/PET was attached to the vertexes of the pyramids to form a sandwich-like structure of ITO/PET-PDMS having porous pyramidal structures-ITO/PET, thereby providing an electrostatic capacitive pressure sensor.

Manufacture of Contact Resistance-Based Pressure Sensor

Referring to FIG. 16, PDMS having porous pyramidal structures was subjected to chemical surface treatment so that a conductive polymer, polypyrrole (PPy) might be bound chemically thereto. Then, the resultant structure was attached to two electrodes not connected from side to side to obtain a contact resistance-based pressure sensor capable of measuring electric current between the two electrodes.

Test Examples

Analysis of Transparency

In this Test Example, the transparent sensor using materials having a similar refractive index and a micropattern having pyramidal structures according to the present disclosure was analyzed in terms of transparency.

Figure 6:
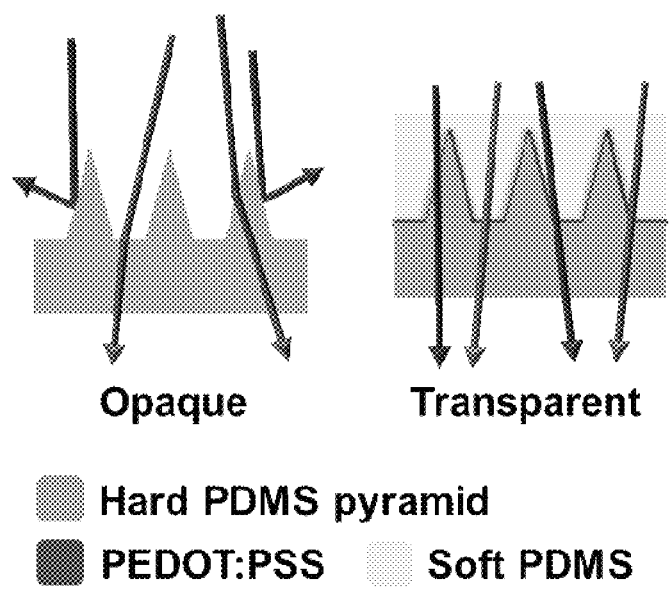
FIG. 6 illustrates the theory of transparency according to the present disclosure.
Figure 7:
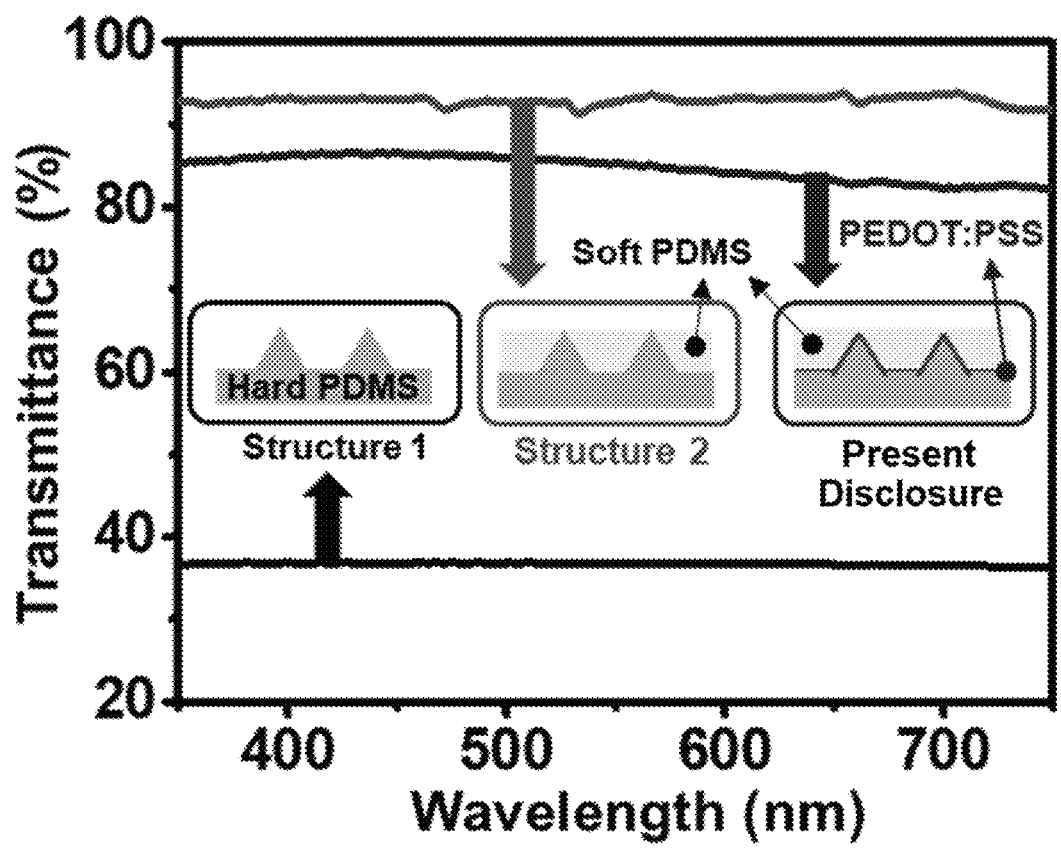
FIG. 7 is a graph illustrating the transmittance of a sensor using hard polydimethyl siloxane/PEDOT:PSS/soft polydimethyl siloxane as the first substrate/electrode layer/second substrate, respectively, according to an embodiment of the present disclosure.

FIG. 6 illustrates the theory of transparency according to the present disclosure, and FIG. 7 is a graph illustrating the transmittance of a sensor using hard polydimethyl siloxane/PEDOT:PSS/soft polydimethyl siloxane as the first substrate/electrode layer/second substrate, respectively, according to an embodiment of the present disclosure.

Referring to FIG. 6 and FIG. 7, transparency varies with similarity of refractive indexes of the pyramidal structures (first substrate) and the upper substrate (second substrate) with which the first substrate is filled. Particularly, as can be seen from the result of FIG. 7, merely a transmittance of less than 40% is shown, when using the first substrate (structure 1, hard) alone. This is because the irradiated light within the visible light range is refracted, reflected and scattered directly by the pyramid structures as shown in FIG. 6. However, when using a substrate (soft PDMS) having the same or a similar refractive index (difference in refractive index of 10% or less in the visible light range) with the electrode layer (PEDOT:PSS) interposed between the substrates, it is possible to obtain a transmittance of 80% or higher despite the use of the electrode layer.

Figure 8:
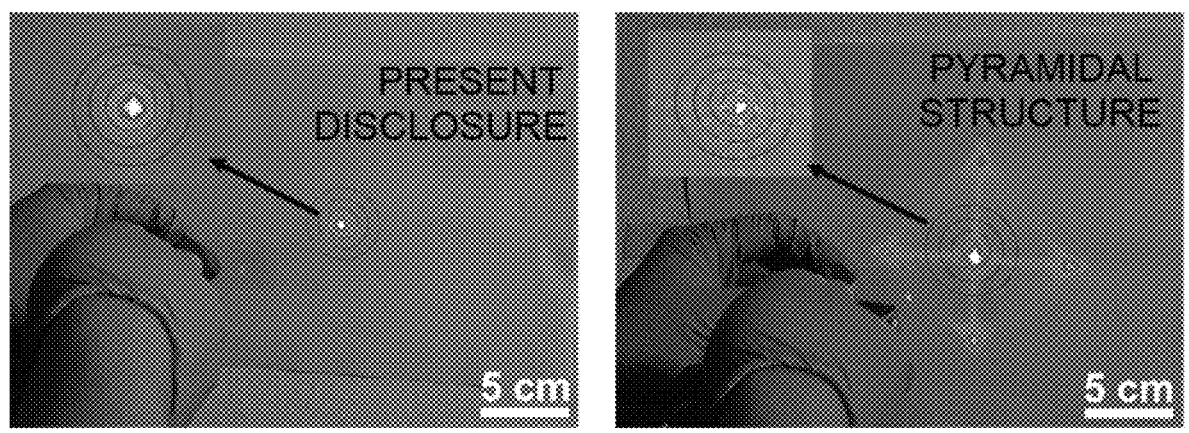
FIG. 8 is a photographic view illustrating an embodiment (right side) wherein the first substrate having a pattern with pyramidal structures is used alone, and significant elimination of the problem of scattering through the use of the second substrate having a similar refractive index and the first electrode layer.

FIG. 8 is a photographic view illustrating an embodiment (right side) wherein the first substrate having a pattern with pyramidal structures is used alone, and significant elimination of the problem of scattering through the use of the second substrate having a similar refractive index and the first electrode layer.

Analysis of Sensing Effect

In this test example, the transparent pressure sensor (present disclosure) according to the above Example, a pressure sensor not using the first electrode layer but including an electrode layer at the bottom of the first substrate and the top of the second substrate (pyramid PDMS), and a pressure sensor having no pyramidal pattern (bare PDMS film) were determined in terms of a change in electrostatic capacity depending on extent of pressure and sensitivity.

Figure 9:
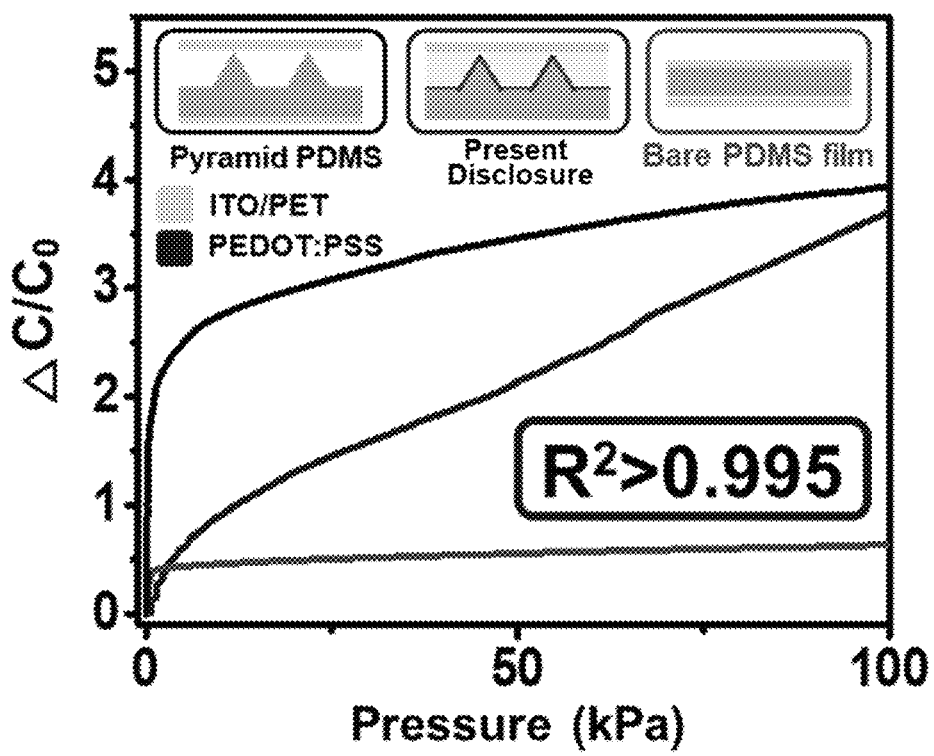
FIG. 9 is a graph illustrating a change in electrostatic capacity depending on an increase in pressure of the sensor according to an embodiment of the present disclosure.
Figure 10:
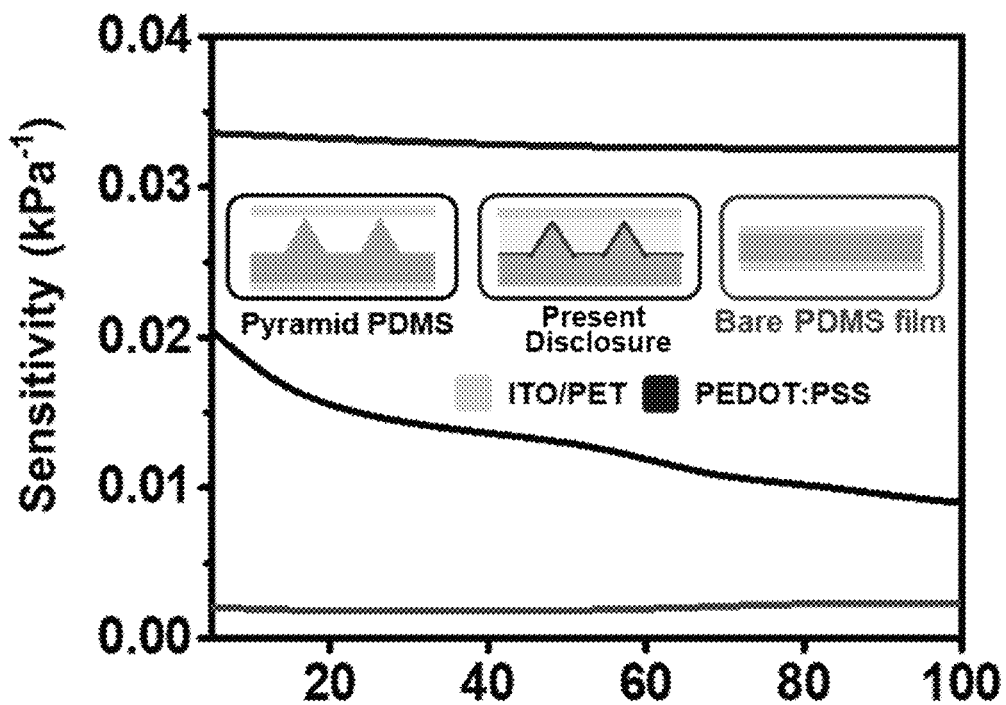
FIG. 10 is a graph illustrating the sensitivity of the sensor according to an embodiment of the present disclosure.

FIG. 9 is a graph illustrating a change in electrostatic capacity depending on an increase in pressure of the sensor according to an embodiment of the present disclosure, and FIG. 10 is a graph illustrating the sensitivity of the sensor according to an embodiment of the present disclosure.

Referring to FIG. 9 and FIG. 10, the pressure sensor according to the present disclosure (blue color) shows higher linearity. It can be seen that the sensor according to the present disclosure undergoes a linear decrease in height and angle, while maintaining the pyramidal structures (i.e., the pyramidal structures should have higher rigidity as compared to the upper material layer), unlike the structures undergoing a rapid increase in effective area between electrodes, as the vertexes of the pyramids cave in as described above. Thus, in the case of the pressure sensor according to the present disclosure, substantial effective area is also increased linearly, and thus shows constant sensitivity even in a broad pressure range (100 kPa).

The transparent pressure sensor according to the present disclosure provides high linearity and sensitivity by virtue of the electrode maintaining pyramidal structures even under pressure application, while maintaining high transmittance (80% or more in the visible light range) as described above. Therefore, the transparent pressure sensor according to the present disclosure may be used for any electronic devices, such as displays, requiring a pressure sensor.

Effect of Material Ductility

According to the present disclosure, materials having a different level of ductility are used so that the lower pyramidal structures having lower ductility may be retained even under pressure application, and thus the pressure sensor shows improved sensing sensitivity.

However, when the upper substrate (second substrate) has the same level of ductility as the lower substrate (first substrate), such a sensing effect is reduced.

Figure 11:
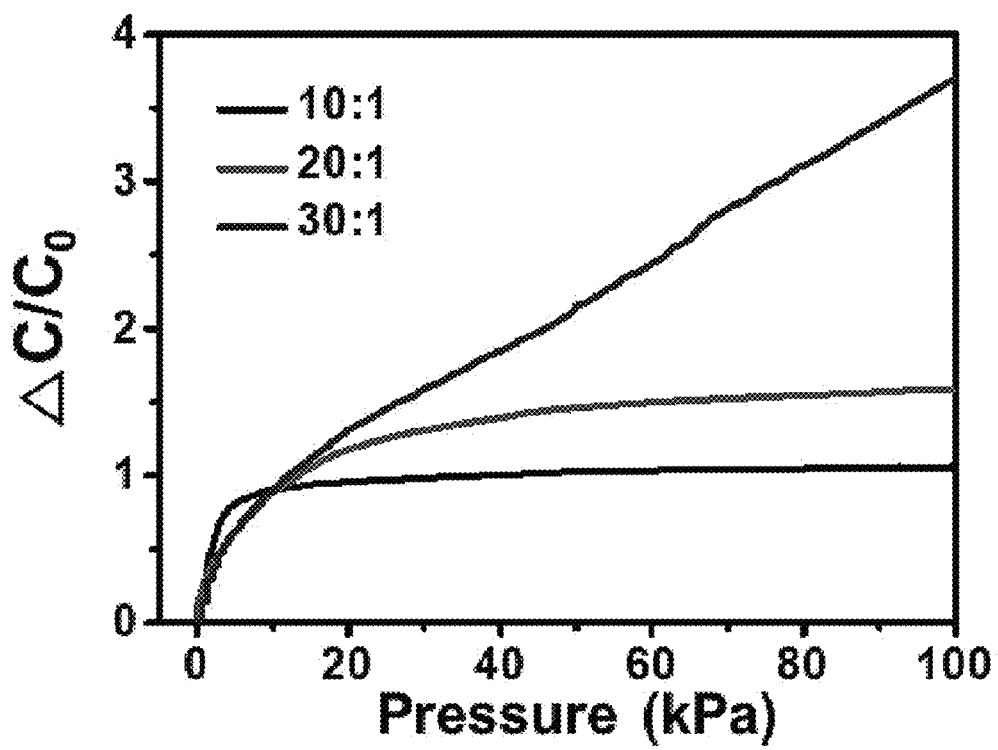
FIG. 11 illustrates the result of sensing effects when forming the second substrate by using different curing agents in a polydimethyl siloxane base solution.

FIG. 11 illustrates the result of sensing effects when forming the second substrate by using different curing agents in a polydimethyl siloxane base solution. The ratio shown in FIG. 11 is the weight ratio of polydimethyl siloxane base solution:curing agent. Polydimethyl siloxane becomes softer, as the proportion of the base solution is increased. In other words, ductility of polydimethyl siloxane is reduced in the order of 30:1, 20:1 and 10:1.

Referring to FIG. 11, sensor performance is tested by using variable ductility (10:1 or 20:1) of a soft substrate to determine the effect of a difference in rigidity between hard polydimethyl siloxane and soft polydimethyl siloxane upon sensor performance. As can be seen from FIG. 11, use of hard polydimethyl siloxane causes a decrease in width of linear response of the sensor to pressure and a rapid drop in sensitivity to pressure. Therefore, when manufacturing a sensor having pyramidal structures by using a hard substrate/hard substrate, it is not possible to obtain a linear change of the sensor, unlike the sensor according to the present disclosure.

Effect of Thickness of Second Substrate

The thickness of a soft substrate (second substrate) having higher ductility affects the performance of a sensor.

Figure 12:
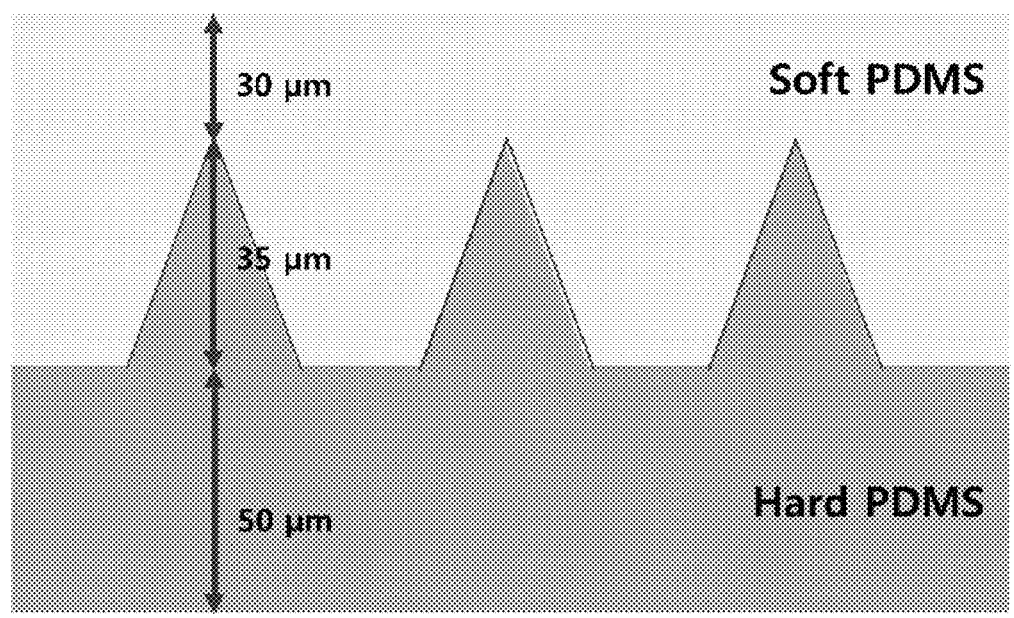
FIG. 12 is a sectional view of the sensor according to an embodiment of the present disclosure.
Figure 13:
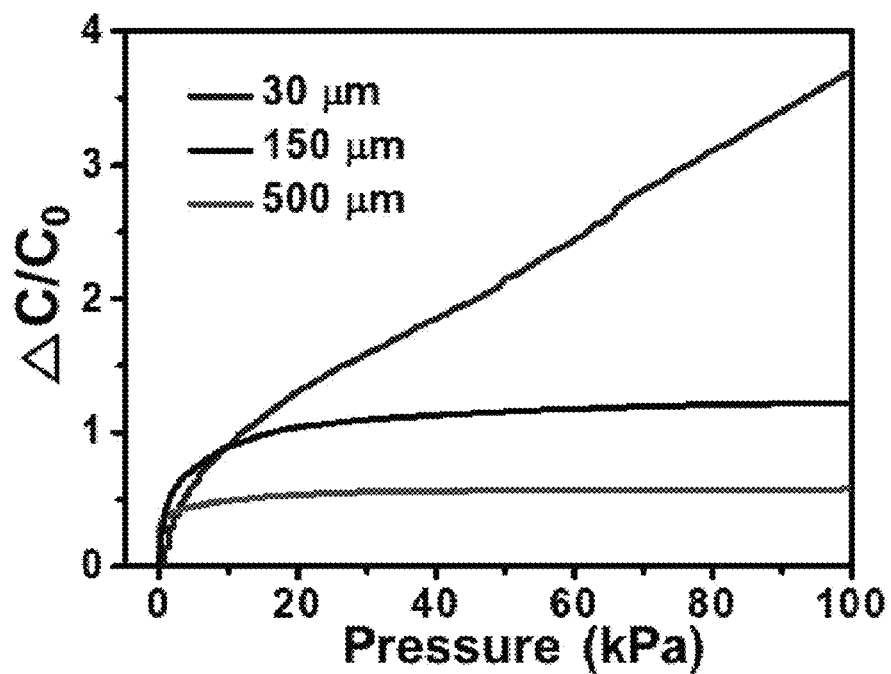
FIG. 13 is a graph illustrating the analysis result of sensing property when using a substrate with a different thickness (i.e. distance between the pyramid vertex and the surface of the second substrate).

FIG. 12 is a sectional view of the sensor according to an embodiment of the present disclosure, and FIG. 13 is a graph illustrating the analysis result of sensing property, when using a substrate with a different thickness (i.e. distance between the pyramid vertex and the surface of the second substrate).

Referring to FIG. 12 and FIG. 13, as the thickness of the soft substrate (second substrate) is decreased, the sensor shows higher linearity. This is because the effect of 'C' upon 'd' is increased in the formula of $C=\varepsilon A/d$, wherein 'A' is area and 'd' is distance between electrode, as the thickness of the second substrate is increased. In other words, the predominant reason why the sensor according to the present disclosure shows such a linear response is the effect of A. However, when the thickness of the soft substrate layer is increased, the effect of 'd' is increased but the effect of 'A' is decreased. Therefore, it is preferred that the ratio of the height of the pyramid to the distance between the vertex of the pyramid and the second substrate is 0.5-5. In other words, it can be seen from the result of FIG. 13 that when the pyramid has a height of 35 μm and a thickness of 150 μm, linearity is decreased significantly. Therefore, it is preferred that the ratio of the height (35 μm) of the pyramid to the thickness thereof is less than 5.

Sensitivity of Electrostatic Capacitive Pressure Sensor

Figure 21:
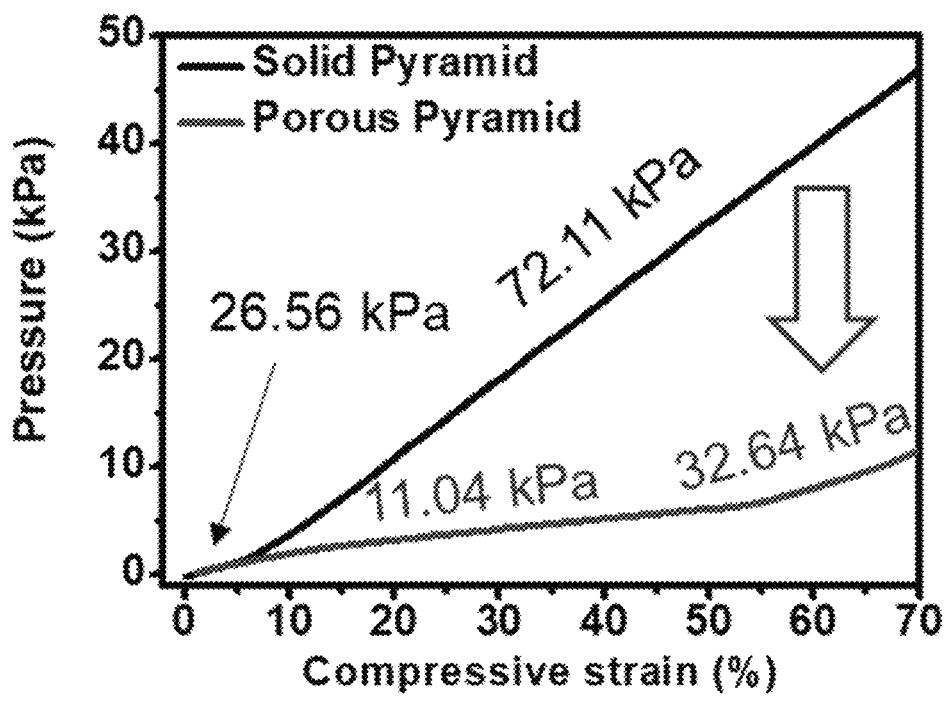
FIG. 21 illustrates the compressive elastic modulus and sensitivity of an electrostatic capacitive pressure sensor.
Figure 21:
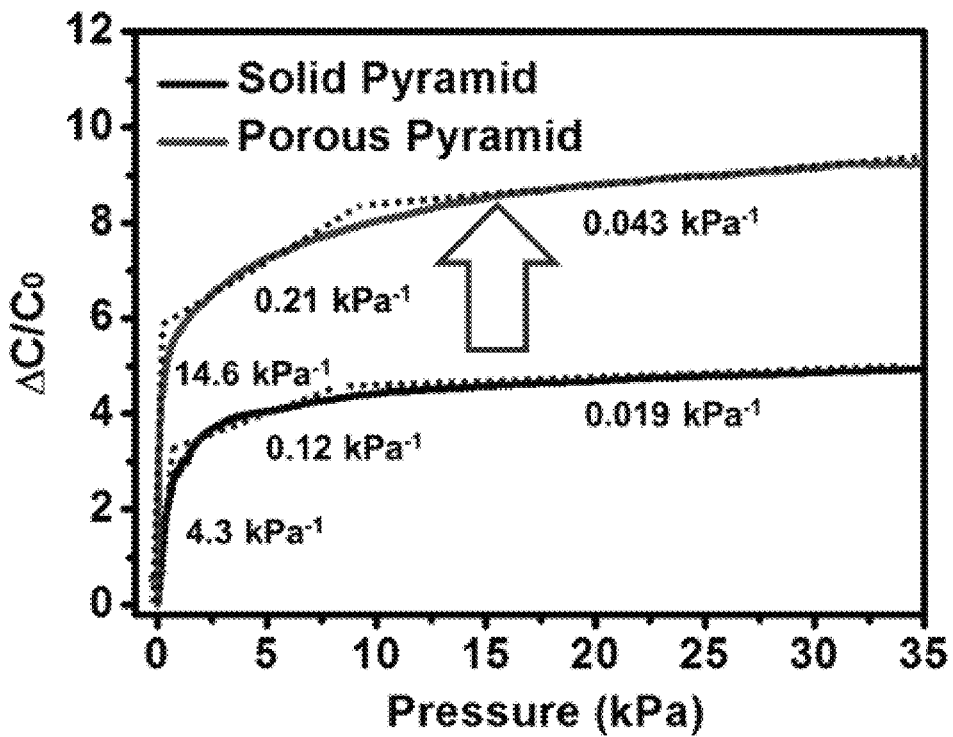

FIG. 21 illustrates the compressive elastic modulus (a) and sensitivity (b) of an electrostatic capacitive pressure sensor.

Referring to FIG. 21, the structure having porous pyramidal structures has lower compressive elastic modulus as compared to the basis pyramid structures, and thus shows a higher degree of deformation. As a result, the electrostatic capacitive pressure sensor shows high sensitivity even in a low pressure recognition range. More particularly, while the electrostatic capacitive pressure including basic pyramidal structures shows the highest sensitivity of 4.3 kPa$^{-1}$, the structure having porous pyramidal structures shows the highest sensitivity of 14.6 kPa$^{-1}$, which is increased by about 3.4 times or more.

Sensitivity of Contact Resistance-Based Pressure Sensor

Figure 22:
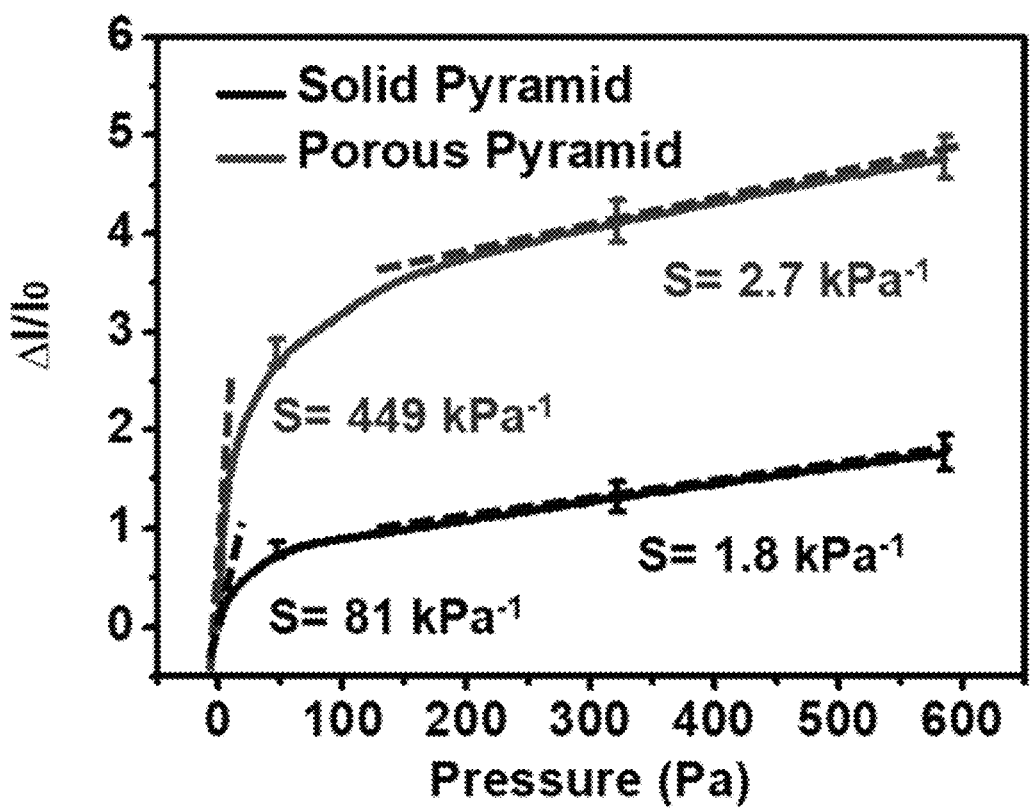
FIG. 22 illustrates the sensitivity of a contact resistance-based highly sensitive pressure sensor.

FIG. 22 illustrates the sensitivity of a contact resistance-based highly sensitive pressure sensor.

Referring to FIG. 22, the contact resistance-based pressure sensor including a structure having porous pyramidal structures shows higher sensitivity as compared to the contact resistance-based pressure sensor including basic pyramidal structures. More particularly, while the contact resistance-based pressure sensor including basic pyramidal structures shows the highest sensitivity of 81 kPa$^{-1}$, the contact resistance-based pressure sensor including a structure having porous pyramidal structures shows the highest sensitivity of 449 kPa$^{-1}$, which is increased by about 5.5 times or more.

Sensing Property of Porous Pyramidal Structure-Based Pressure Sensor

1. Hysteresis Phenomenon and Sensing Characteristics Depending on Change in Pressure FIG. 23 illustrates the hysteresis (a) and sensing property (b) depending on a change in pressure of a pressure sensor based on porous pyramidal structures.

Figure 23:
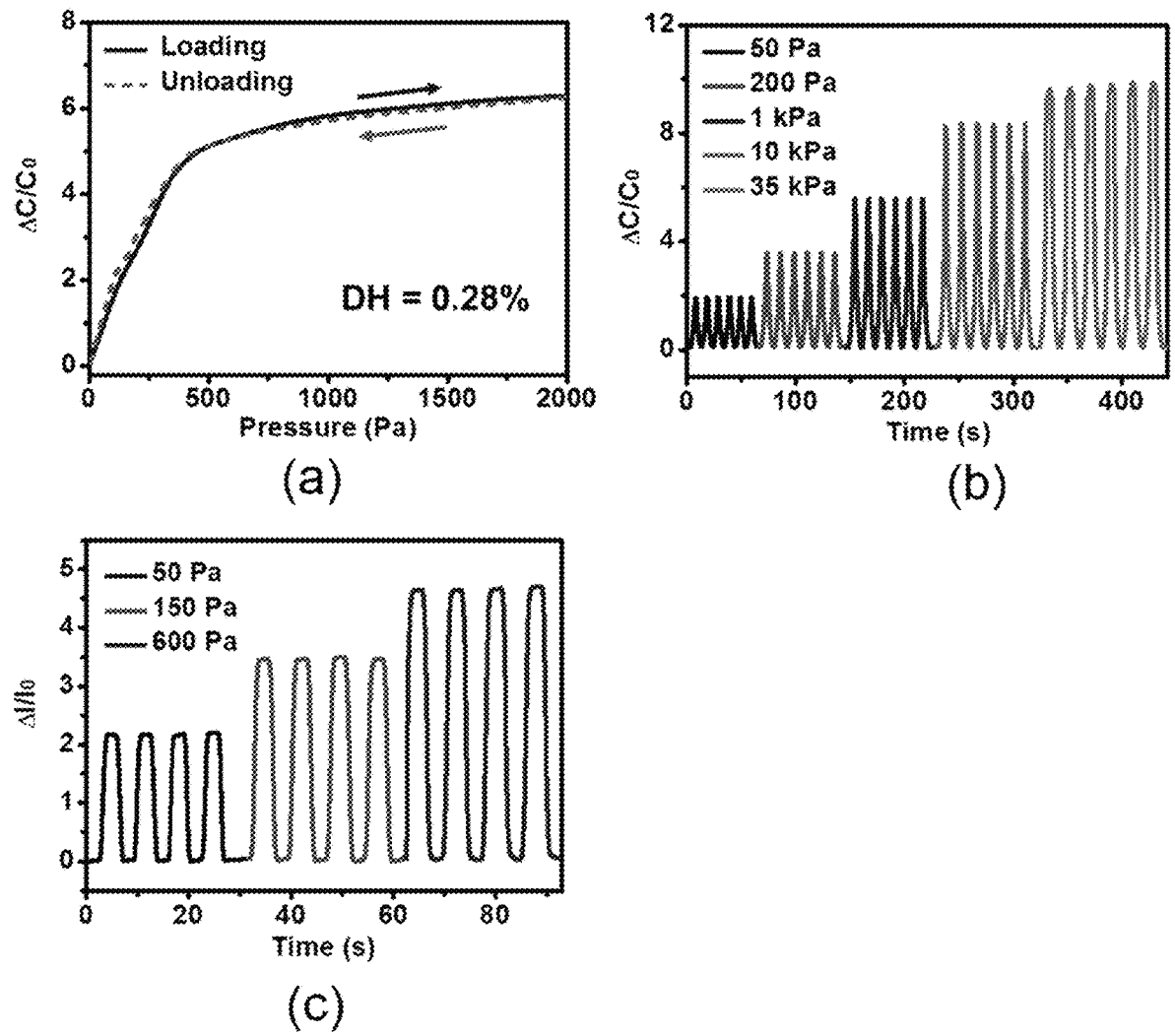
FIG. 23 illustrates the hysteresis and sensing property depending on a change in pressure of a pressure sensor based on porous pyramidal structures.

Referring to FIG. 23, the pressure sensor based on porous pyramidal structures shows significantly low hysteresis phenomenon (a). In addition, the electrostatic capacitive pressure sensor (b) and contact resistance-based pressure sensor (b) based on porous pyramidal structures show uniform sensing characteristics even under different pressures, and thus are shown to have constant sensitivity even in a broad range of pressure.

2. Sensing Property for 5000th Cycle and Response Rate and Recovery Rate of Sensor FIG. 24 illustrates the sensing property (a), and sensor response rate and recovery rate (b, c) of a pressure sensor based on porous pyramidal structures for 5000 cycles.

Figure 24:
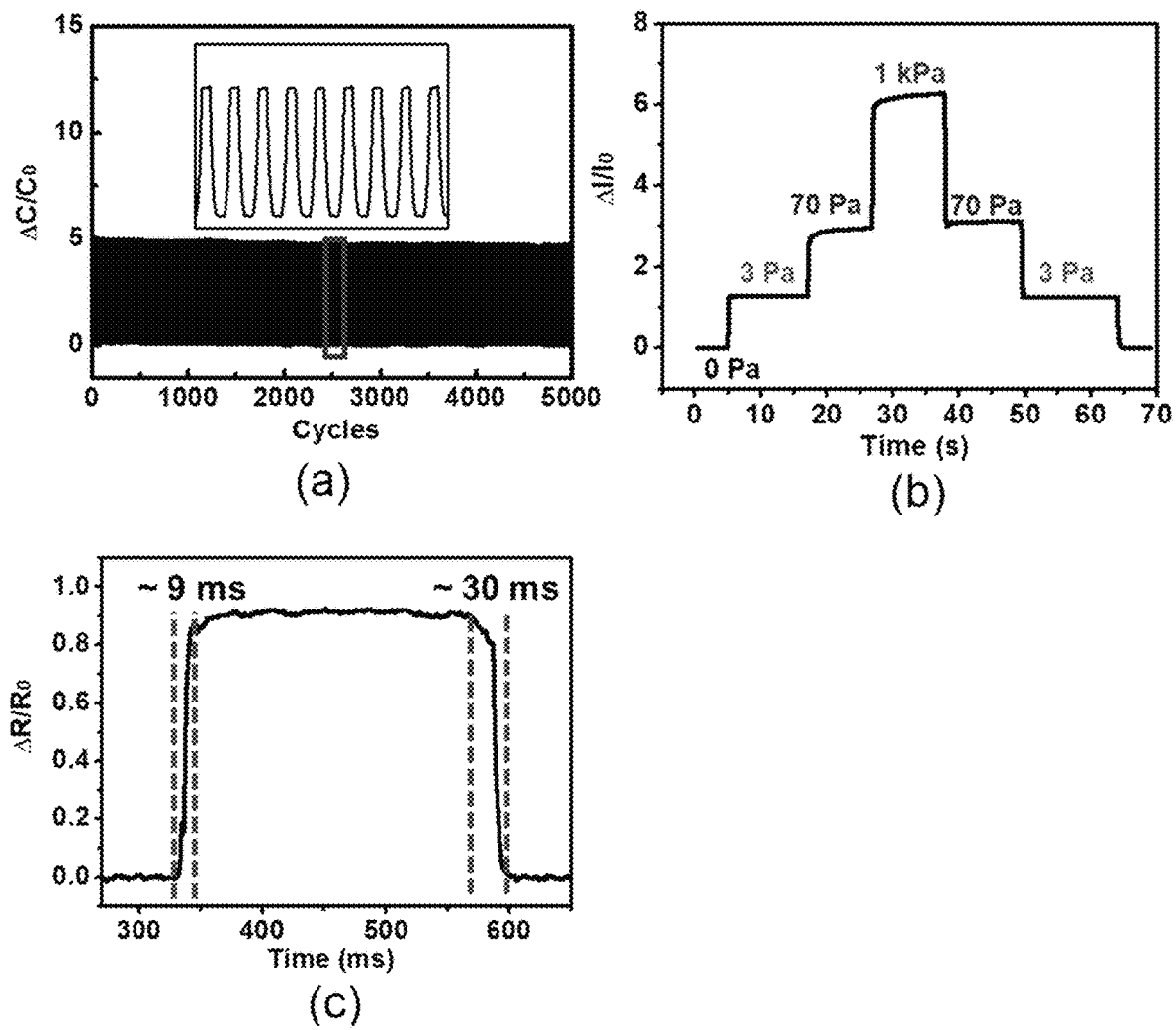
FIG. 24 illustrates the sensing property, and sensor response rate and recovery rate of a pressure sensor based on porous pyramidal structures for 5000 cycles.

Referring to FIG. 24, the pressure sensor based on porous pyramidal structures allows stable detection even at the 5000th cycle and shows a significantly high response rate and recovery rate.

Determination of Pressure of Various Objects

Figure 25:
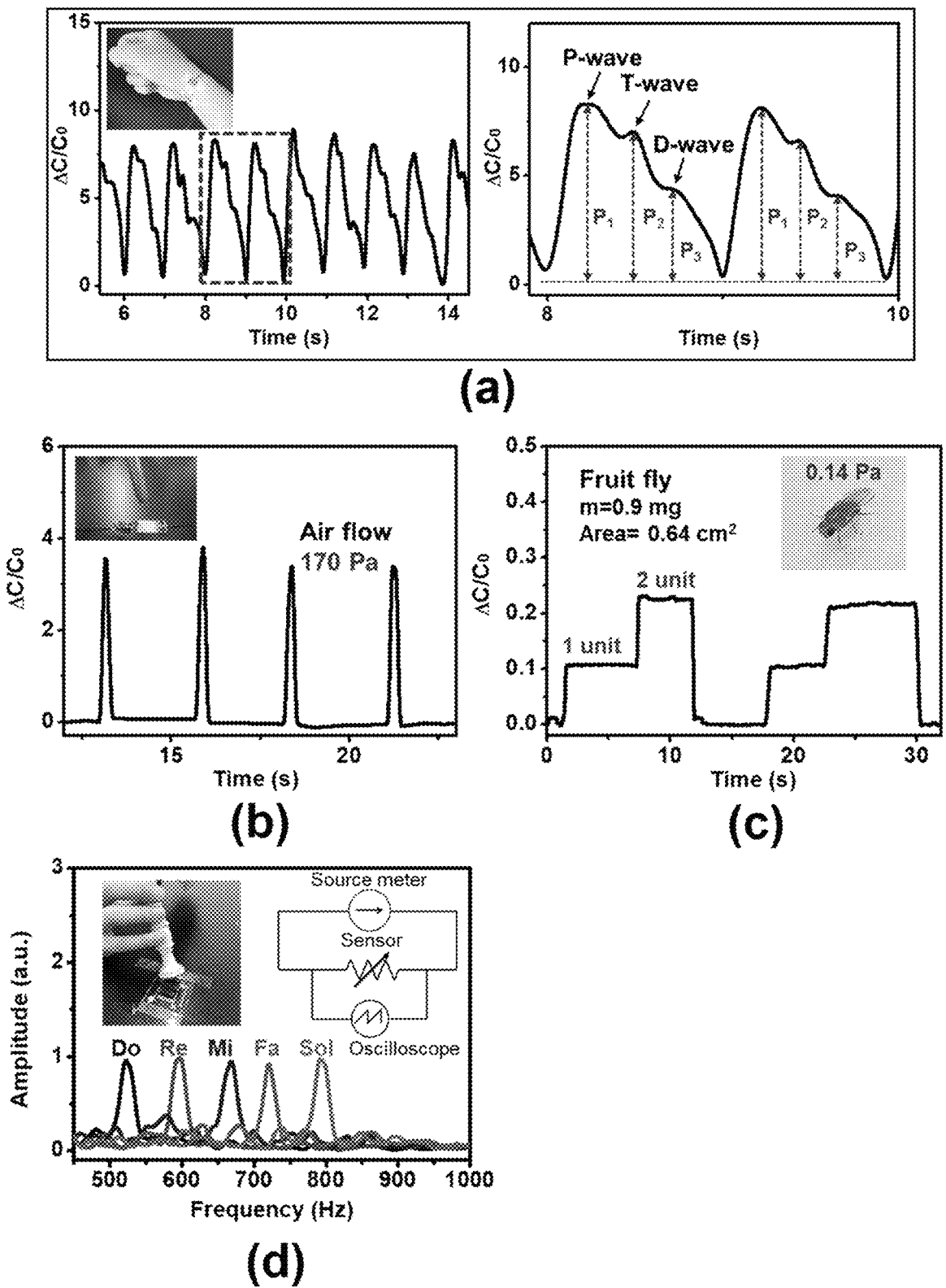
FIG. 25 is a graph illustrating the results of detecting human pulses, wind, pomace fly weight and recorder scale by using the highly sensitive pressure sensor according to the present disclosure.

FIG. 25 is a graph illustrating the results of detecting human pulses (a), wind (b), pomace fly weight (c) and recorder scale (d) by using the highly sensitive pressure sensor according to the present disclosure.

Referring to FIG. 25, the highly sensitive pressure sensor according to the present disclosure allows detection of minute pressure of human pulses, wind, pomace fly weight, recorder scale, or the like, based on its high sensitivity. Thus, it is shown that the pressure sensor may be applied to various health-care wearable devices.

Determination of Pressure of Various Objects Using Smart Glove

Figure 26:
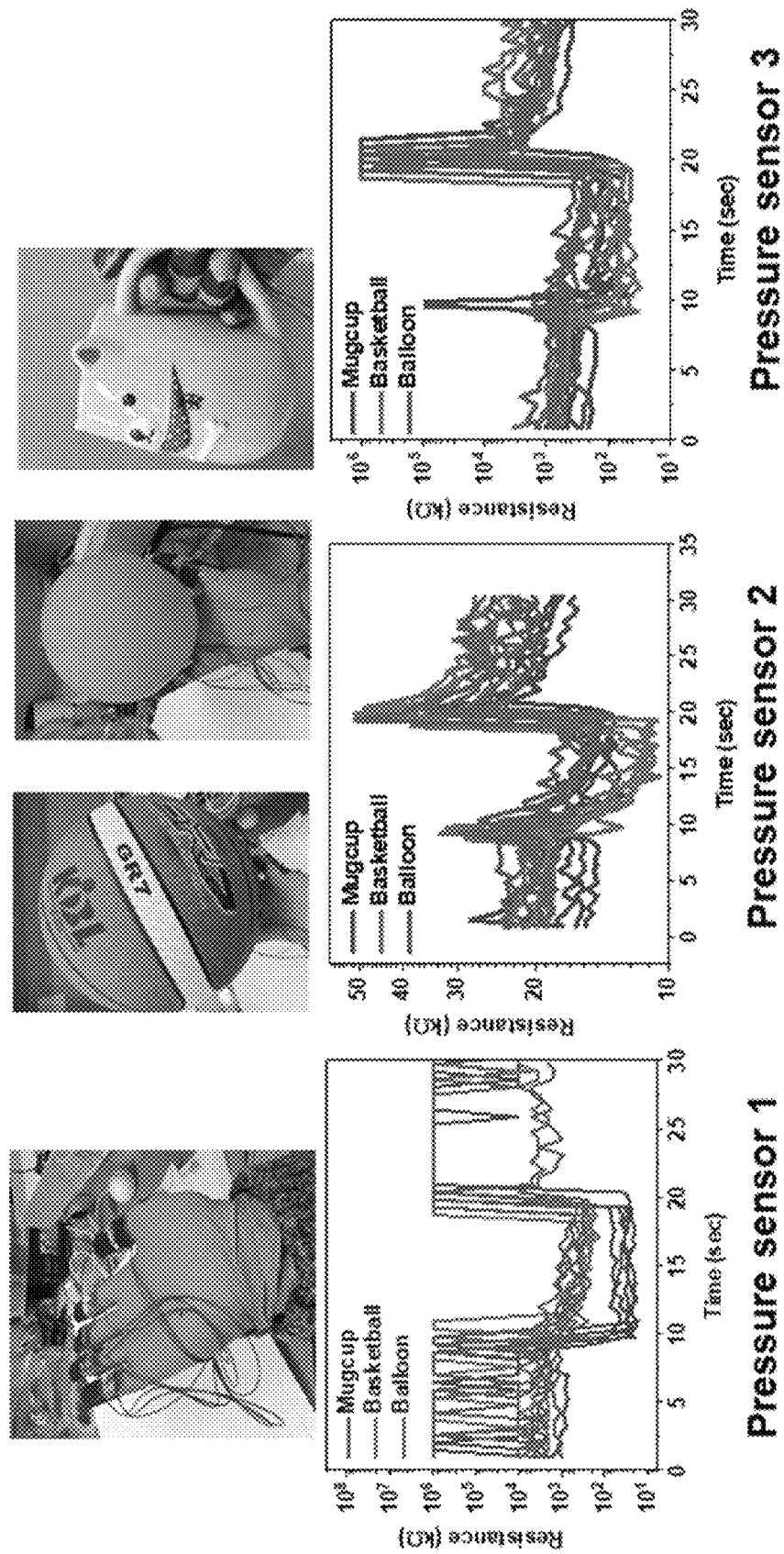
FIG. 26 is a graph illustrating the result of measuring pressure of various objects by using a smart glove using the highly sensitive pressure sensor according to the present disclosure.
Figure 27:
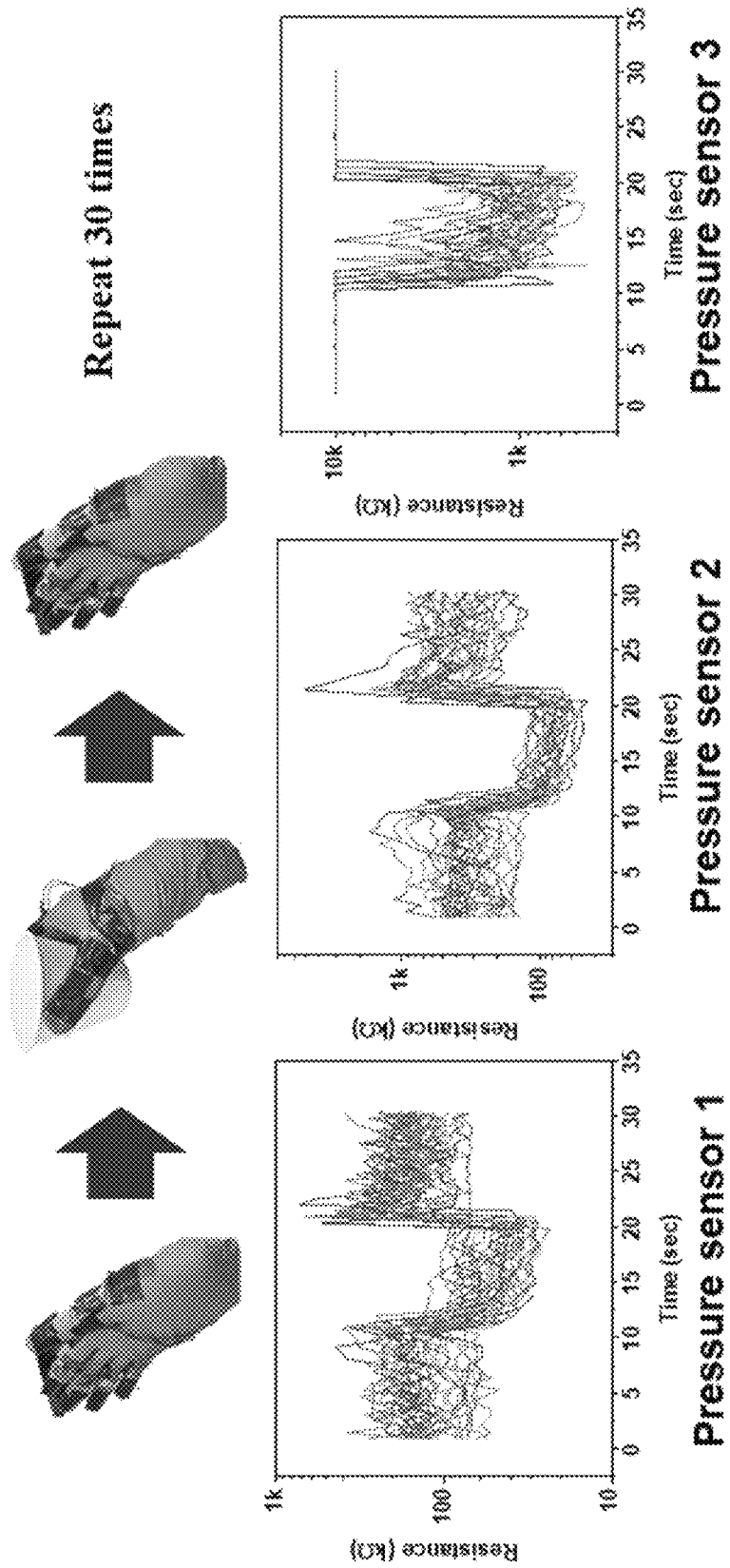
FIG. 27 illustrates the result of the uniformity test of a sensor using a paper cup.

FIG. 26 is a graph illustrating the result of measuring pressure of various objects by using a smart glove using the highly sensitive pressure sensor according to the present disclosure, and FIG. 27 illustrates the result of the uniformity test of a sensor using a paper cup.

Referring to FIG. 26, the smart glove using the highly sensitive pressure sensor according to the present disclosure shows high sensitivity and stability, and thus allows uniform detection of pressure distribution of various objects, such as a basketball, balloon, mug cup, or the like. In addition, referring to FIG. 27, the sensor shows a uniform signal response and constant sensitivity, when a paper cup is taken by the smart glove repeatedly 30 times.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A transparent pressure sensor comprising:
   a first substrate on which a micropattern having pyramidal structures is formed;
   a first electrode layer coated on the micropattern of the first substrate;
   a second substrate stacked on the first electrode layer; and
   a second electrode layer stacked on the second substrate,
   wherein the first substrate and the second substrate show a difference in light refractive index of 10% or less in the visible light region.

2. The transparent pressure sensor of claim 1, wherein the first substrate has lower ductility as compared to the second substrate.

3. The transparent pressure sensor of claim 2, which measures pressure applied thereto through a change in effective area of the first electrode layer having the pyramidal structures deformed by the applied pressure.

4. The transparent pressure sensor of claim 1, wherein the first substrate undergoes a decrease in height and angle, while maintaining the pyramidal structures, as the second substrate is pressed.

5. The transparent pressure sensor of claim 1, wherein the micropattern of the first substrate having pyramidal structures is filed with the second substrate.

6. The transparent pressure sensor of claim 1, wherein the first substrate and the second substrate comprise polydimethyl siloxane.

7. The transparent pressure sensor of claim 6, wherein the first electrode layer and the second electrode layer are transparent electrodes.

8. The transparent pressure sensor of claim 1, wherein the ratio of the height of the pyramidal structure to the distance between the second substrate and the vertex of the pyramidal structure is equal to or more than 0.5 and less than 5.

9. An electronic device comprising the transparent pressure sensor of claim 1.

10. The transparent pressure sensor of claim 1, wherein the first electrode layer comprises PEDOT:PSS (poly(3,4-ethylenedioxythiophene):polystyrene sulfonate) conductive polymer.

11. An electrostatic capacitive highly sensitive pressure sensor comprising:
   an upper electrode layer;
   a polymer layer comprising a polymer material having porous pyramidal structures; and
   a lower electrode layer.

12. The electrostatic capacitive highly sensitive pressure sensor of claim 11, wherein the polymer material is polydimethyl siloxane (PDMS), and the upper electrode layer and the lower electrode layer are indium tin oxide (ITO)/polyethylene terephthalate (PET) electrodes.

13. The electrostatic capacitive highly sensitive pressure sensor of claim 11, which measures pressure applied thereto through a change in thickness of the polymer layer caused by deformation of the porous pyramidal structures upon the pressure application.

14. An electronic device comprising the highly sensitive pressure sensor of claim 11.

15. A contact resistance-based highly sensitive pressure sensor comprising:
   a substrate;
   an electrode formed on the substrate;
   a polymer structure having porous pyramidal structures; and
   a conductive polymer coated on the polymer structure.

16. The contact resistance-based highly sensitive pressure sensor of claim 15, wherein the polymer structure comprises polydimethyl siloxane (PDMS), and the conductive polymer is polypyrrole (PPy).

17. The contact resistance-based highly sensitive pressure sensor of claim 15, which measures pressure applied thereto through a change in contact area between the conductive polymer and the electrode caused by deformation of the porous pyramidal structures upon the pressure application.

* * * * *